United States Patent
Wang et al.

(10) Patent No.: US 9,703,348 B2
(45) Date of Patent: Jul. 11, 2017

(54) SYSTEMS AND METHODS FOR VIRTUAL CURRENT SHARING BETWEEN A POWER SUPPLY UNIT AND A BATTERY BACK-UP UNIT

(71) Applicant: Dell Products L.P., Round Rock, TX (US)

(72) Inventors: Lei Wang, Austin, TX (US); John Erven Jenne, Austin, TX (US); Stuart Allen Berke, Austin, TX (US); Sanjiv Catibog Sinha, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 4 days.

(21) Appl. No.: 14/845,029

(22) Filed: Sep. 3, 2015

(65) Prior Publication Data
US 2017/0068294 A1    Mar. 9, 2017

(51) Int. Cl.
*G06F 1/26* (2006.01)
*G06F 1/30* (2006.01)
*G06F 1/28* (2006.01)

(52) U.S. Cl.
CPC ............... *G06F 1/30* (2013.01); *G06F 1/263* (2013.01); *G06F 1/28* (2013.01)

(58) Field of Classification Search
CPC ... G06F 1/26; G06F 1/30; G06F 1/263; G06F 1/28
USPC .............................................. 713/300; 714/14
See application file for complete search history.

(56) References Cited

U.S. PATENT DOCUMENTS

| | | | |
|---|---|---|---|
| 4,860,185 A | 8/1989 | Brewer et al. | |
| 5,576,941 A * | 11/1996 | Nguyen | H02J 9/062 363/133 |
| 7,589,498 B2 | 9/2009 | Choy | |
| 8,806,238 B2 | 8/2014 | Jau et al. | |
| 8,943,338 B2 | 1/2015 | Jau et al. | |
| 2003/0095366 A1 * | 5/2003 | Pellegrino | H02J 1/10 361/93.1 |
| 2007/0029979 A1 * | 2/2007 | Williams | G05F 1/66 323/217 |
| 2007/0179723 A1 * | 8/2007 | Kasprzak | G06F 1/28 702/60 |
| 2008/0315828 A1 | 12/2008 | Lu et al. | |

(Continued)

OTHER PUBLICATIONS

International Search Report and Written Opinion of the International Searching Authority, International Application No. PCT/US2016/048167, mailed Oct. 28, 2016.

*Primary Examiner* — Chun Cao
(74) *Attorney, Agent, or Firm* — Jackson Walker L.L.P.

(57) ABSTRACT

In accordance with embodiments of the present disclosure, a battery back-up unit for supplying electrical energy to an information handling resource via a power bus in response to a power event affecting an ability of a power supply unit to deliver electrical energy to the information handling resource via the power bus may be configured to, in response to the power event and prior to the power supply unit ceasing to deliver electrical energy to the power bus monitor a current share bus having a current share signal driven at least in part by the power supply unit, the current share signal indicative of a first current driven by the power supply unit to the power bus, drive a second current to the power bus in accordance with the current share signal, and refrain from driving the current share bus.

16 Claims, 2 Drawing Sheets

(56) References Cited

U.S. PATENT DOCUMENTS

| | | | |
|---|---|---|---|
| 2009/0307514 A1* | 12/2009 | Roberts | G06F 1/26 713/330 |
| 2011/0205769 A1* | 8/2011 | Blackwell | H02J 1/10 363/65 |
| 2011/0266867 A1* | 11/2011 | Schindler | G06F 1/266 307/24 |
| 2012/0216055 A1 | 8/2012 | Dumas et al. | |
| 2013/0030735 A1 | 1/2013 | Jau et al. | |
| 2013/0031381 A1 | 1/2013 | Jau et al. | |

* cited by examiner

SYSTEMS AND METHODS FOR VIRTUAL CURRENT SHARING BETWEEN A POWER SUPPLY UNIT AND A BATTERY BACK-UP UNIT

TECHNICAL FIELD

The present disclosure relates in general to information handling systems, and more particularly to systems and methods for current sharing between a power supply unit and a battery back-up unit in an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system may include one or more power supply units for providing electrical energy to components of the information handling system. Typically, a power supply unit is configured to operate from an input alternating current (AC) source of electrical energy, which the power supply unit converts to a direct current (DC) output. Thus, typically a power supply unit may include a rectifier and/or power factor correction stage to receive the input AC source and rectify the input AC waveform to charge a bulk capacitor to a desired voltage. A direct-current-to-direct-current (DC-DC) stage may convert the voltage on the bulk capacitor to a DC output voltage which may be used to power components of the information handling system.

In traditional approaches, a power supply unit may be capable of, immediately after removal of the AC source to the power supply unit, providing electrical energy at its output for a period of time using the stored charge on the bulk capacitor to provide an output direct-current voltage. Such a period of time is limited, of course, as once the alternating current input is not available, the bulk capacitor will discharge and the power supply unit will shutdown. A portion of this period of time is known as a ride-through time and represents a period of time for which the power supply unit continues to generate a direct current output while waiting for reapplication of the AC source. If the AC source is not reapplied within the ride-through time, the available stored energy on the bulk capacitor may fall below a threshold, and the power supply unit may de-assert a signal. The de-assertion of such signal signifies entry into a period known as the hold-up time in which the information handling system may use additional energy remaining stored within the bulk capacitor to facilitate a graceful handover from the power supply unit to one or more battery back-up units configured to provide electrical energy to components of an information handling system resulting from loss of external power source.

Typically, a battery back-up unit will have a lower power rating than the power supply unit. Because the battery back-up unit has a different power rating, maintaining a stable current transition between the power supply unit and the battery back-up unit presents many challenges.

SUMMARY

In accordance with the teachings of the present disclosure, the disadvantages and problems associated with existing approaches to current sharing between a power supply unit and a battery back-up unit in an information handling system may be reduced or eliminated.

In accordance with embodiments of the present disclosure, an information handling system may include an information handling resource, a power supply unit for supplying electrical energy to the information handling resource via a power bus and a battery back-up unit for supplying electrical energy to the information handling resource via the power bus in response to a power event affecting an ability of the power supply unit to deliver electrical energy to the power bus. The battery back-up unit may be configured to, in response to the power event and prior to the power supply unit ceasing to deliver electrical energy to the power bus monitor a current share bus having a current share signal driven at least in part by the power supply unit, the current share signal indicative of a first current driven by the power supply unit to the power bus, drive a second current to the power bus in accordance with the current share signal and refrain from driving the current share bus.

In accordance with these and other embodiments of the present disclosure, a battery back-up unit for supplying electrical energy to an information handling resource via a power bus in response to a power event affecting an ability of a power supply unit to deliver electrical energy to the information handling resource via the power bus may be configured to, in response to the power event and prior to the power supply unit ceasing to deliver electrical energy to the power bus monitor a current share bus having a current share signal driven at least in part by the power supply unit, the current share signal indicative of a first current driven by the power supply unit to the power bus, drive a second current to the power bus in accordance with the current share signal, and refrain from driving the current share bus.

In accordance with these and other embodiments of the present disclosure, a method may include, in a system comprising a battery back-up unit for supplying electrical energy to an information handling resource via a power bus in response to a power event affecting an ability of a power supply unit to deliver electrical energy to the information handling resource via the power bus, in response to the power event and prior to the power supply unit ceasing to deliver electrical energy to the power bus, monitoring, by the battery back-up unit, a current share bus having a current share signal driven at least in part by the power supply unit, the current share signal indicative of a first current driven by the power supply unit to the power bus, driving, by the battery back-up unit, a second current to the power bus in accordance with the current share signal; and refraining, by the battery back-up unit, from driving the current share bus.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
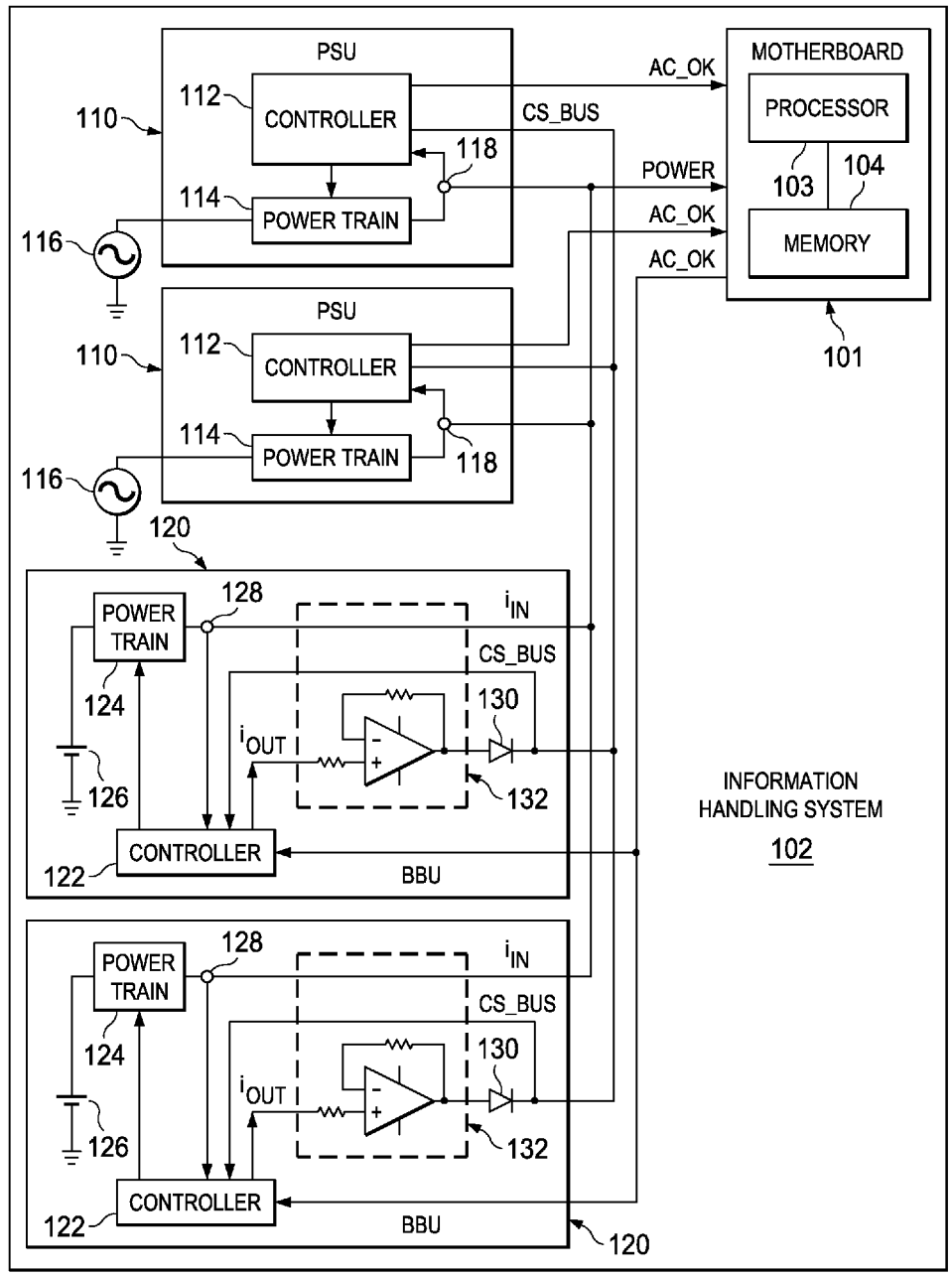
FIG. 1 illustrates a block diagram of an example information handling system, in accordance with embodiments of the present disclosure.
Figure 2:
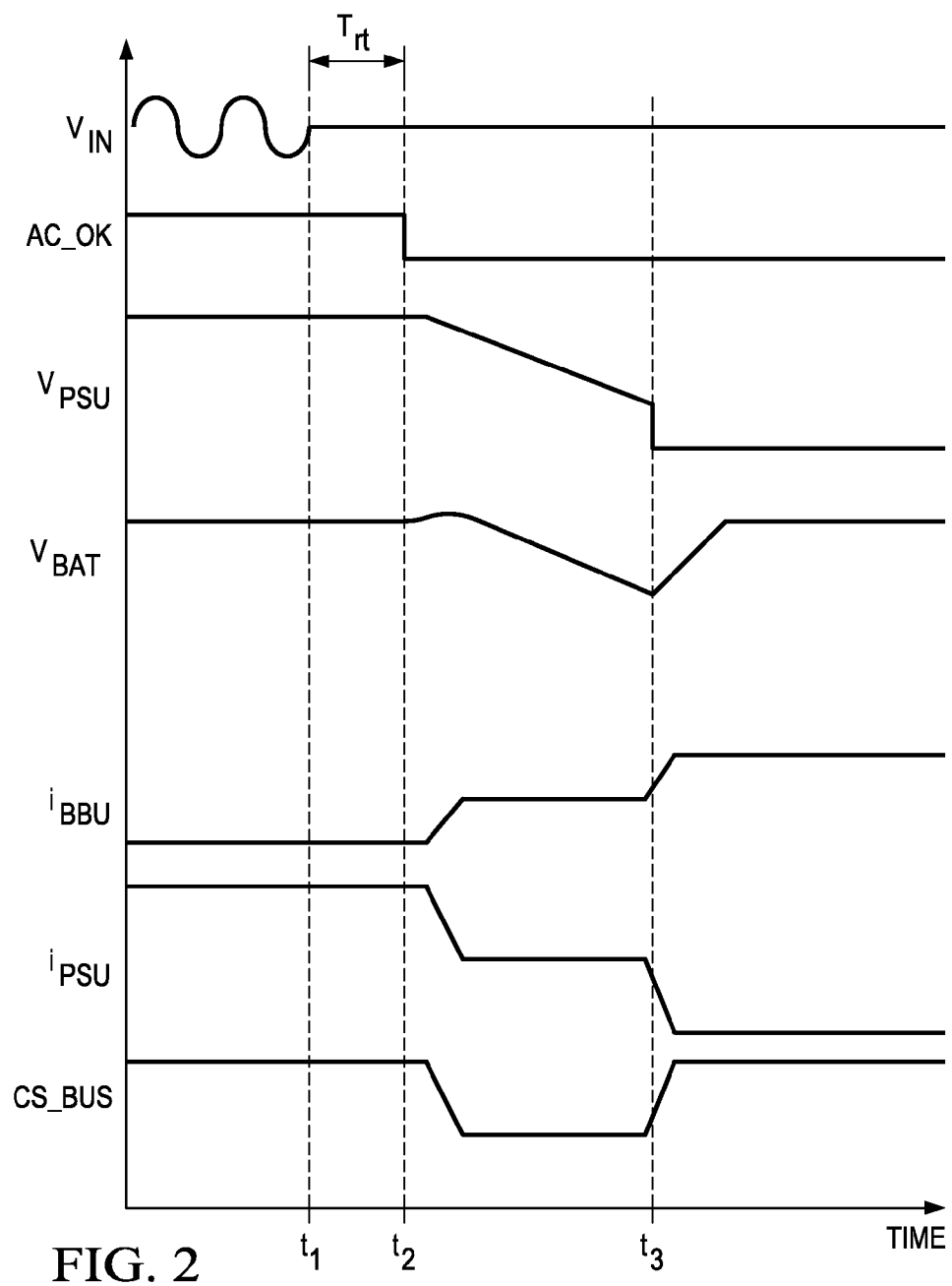
FIG. 2 illustrates a timing diagram depicting various voltages and currents associated with a transition between a power supply unit and a battery back-up unit, in accordance with embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal data assistant (PDA), a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, power supplies, air movers (e.g., fans and blowers) and/or any other components and/or elements of an information handling system.

FIG. 1 illustrates a block diagram of an example of an information handling system 102. As depicted, information handling system 102 may include one or more power supply units (PSUs) 110, one or more battery back-up units (BBUs) 120, a motherboard 101, and one or more other information handling resources.

Motherboard 101 may include a circuit board configured to provide structural support for one or more information handling resources of information handling system 102 and/or electrically couple one or more of such information handling resources to each other and/or to other electric or electronic components external to information handling system 102. As shown in FIG. 1, motherboard 101 may include a processor 103, a memory 104, and one or more other information handling resources.

Processor 103 may comprise any system, device, or apparatus operable to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may comprise any system, device, or apparatus operable to retain program instructions or data for a period of time. Memory 104 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 102 is turned off. In particular embodiments, memory 104 may comprise a non-volatile memory comprising one or more non-volatile dual-inline memory modules (NVDIMMs). Generally speaking, a PSU 110 may include any system, device, or apparatus configured to supply electrical current to one or more information handling resources of information handling system 102. As shown in FIG. 1, a PSU 110 may include a controller 112, a power train 114, and a current sensor 118. Power train 114 of PSU 110 may be coupled at its outputs to a power bus (labeled "POWER" in FIG. 1) configured to deliver electrical energy to motherboard 101 and other components of information handling system 102.

Controller 112 may comprise a microprocessor, DSP, ASIC, FPGA, EEPROM, or any combination thereof, or any other device, system, or apparatus for controlling operation of PSU 110. As such, controller 112 may comprise firmware, logic, and/or data for controlling functionality of PSU 110. As shown in FIG. 1, controller 112 may couple to a current share bus (labeled with voltage CS_BUS in FIG. 1) with which PSUs 110 and BBUs 120 may communicate in order to establish a current share for the various currents delivered to the power bus by PSUs 110 and BBU 120.

Power train 114 may include any suitable system, device, or apparatus for converting electrical energy received by PSU 110 (e.g., a 120-volt alternating current or 240-volt alternating current voltage waveform) from an input source 116 into electrical energy usable to information handling resources of information handling system 102 (e.g., 12-volt direct current voltage source). In some embodiments, power train 114 may comprise a rectifier, a power factor correction circuit, and/or a direct-current-to-direct-current converter. In these and other embodiments, power train 114 may comprise a voltage regulator (e.g., a multi-phase voltage regulator). Although FIG. 1 depicts each PSU 110 having a separate alternating current input source 116, in some embodiments, one or more PSUs 110 may share an alternating current input source 116. In operation, a power train 114 may deliver an amount of electrical current to the power bus in accordance with a control signal communicated from controller 112 indicative of a desired amount of electrical current to be delivered.

Although FIG. 1 depicts each PSU 110 as having an alternating current input source 116, in some embodiments (not shown), power train 114 may include any suitable system, device, or apparatus for converting electrical energy received by PSU 110 e.g., a 48-volt DC or 240-volt DC or 380-volt DC direct current voltage waveform) from a direct current input source into electrical energy usable to information handling resources of information handling system 102 (e.g., 12-volt direct current voltage source). In these and other embodiments, the direct current inputs to power trains 114 may be from independent direct current sources or may be from a shared direct current source.

Current sensor 118 may comprise any suitable system, device, or apparatus for sensing a current delivered by a power train 114 to the power bus and generating a signal indicative of such current. For example, in some embodiments, such current sensor 118 may include a resistor which generates a voltage indicative of the current, in accordance with Ohm's law.

Generally speaking, a BBU 120 may include any system, device, or apparatus configured to supply electrical current to one or more information handling resources of information handling system 102. As shown in FIG. 1, a BBU 120 may include a controller 122, a power train 124, a battery 126, a current sensor 128, a diode 130, and a signal buffer 132. Power train 124 of BBU 120 may be coupled at its outputs to a power bus (labeled "POWER" in FIG. 1) configured to deliver electrical energy to motherboard 101 and other components of information handling system 102. In some embodiments, in the event of a fault of one or more alternating current input sources 116, PSUs 110 coupled to such one or more alternating current input sources 116 may de-assert a signal (labeled AC_OK in FIG. 1 indicating loss by such PSUs 110 of their respective alternating current input sources 116. In other embodiments in which power train 114 uses a direct current source, an analogous signal to AC_OK may be used to indicate the event of a fault of one or more direct current input sources. Furthermore, such signal or a derivative thereof may be communicated to controllers 122 of BBUs 120, causing BBUs 120 to activate from a deactivated state to supply electrical current to the power bus.

Controller 122 may comprise a microprocessor, DSP, ASIC, FPGA, EEPROM, or any combination thereof, or any other device, system, or apparatus for controlling operation of BBU 120. As such, controller 122 may comprise firmware, logic, and/or data for controlling functionality of BBU 120. As shown in FIG. 1, controller 122 may couple to the current share bus (labeled with voltage CS_BUS in FIG. 1). Controller 122 may receive as inputs the voltage CS_BUS from the current share bus and a voltage indicative of a current $i_{IN}$ sensed by a current sensor 128, and based on the voltage CS_BUS and the voltage current $i_{IN}$ in order to generate a control signal to power train 124 to control a current output by power train 124 and to calculate an internal current sense signal $i_{OUT}$ and output such signal (or a voltage representing such signal) to signal buffer 132 (which is shown implemented as a voltage follower in FIG. 1).

Turning again to FIG. 1, power train 124 may include any suitable system, device, or apparatus for converting electrical energy received by BBU 120 from a battery 126 or other energy storage device (e.g., a capacitor) into electrical energy usable to information handling resources of information handling system 102 (e.g., 12-volt direct current voltage source). Accordingly, in some embodiments, power train 124 may comprise a direct-current-to-direct-current converter (e.g., a boost converter or buck converter). In operation, a power train 124 may deliver an amount of electrical current to the power bus in accordance with a control signal communicated from controller 122 indicative of a desired amount of electrical current to be delivered.

Current sensor 128 may comprise any suitable system, device, or apparatus for sensing a current delivered by a power train 124 to the power bus and generating a signal indicative of such current. For example, in some embodiments, such current sensor 128 may include a resistor which generates a voltage indicative of the current, in accordance with Ohm's law.

Diode 130 may have an anode coupled to an output of controller 122 and a cathode coupled to the current share bus (labeled with a voltage CS_BUS) in FIG. 1, and may comprise any system, device, or apparatus configured having an asymmetric conductance; such that it has a low resistance to current in one direction (e.g., from anode to cathode), and high resistance in the other direction (e.g., from cathode to anode). Although diode 130 is depicted as a single diode in FIG. 1, in some embodiments, diode 130 may be implemented as a plurality of physical diodes in series.

In addition to motherboard 101, processor 103, memory 104, management controller 106, PSU 110, and BBU 120, information handling system 102 may include one or more other information handling resources. For example, in some embodiments, information handling system 102 may include a number of PSUs 110 other than two. As another example, in these and other embodiments, information handling system 102 may include a number of BBUs 110 other than two.

Operation of the virtual current sharing functionality of the present disclosure may be understood by reference to FIG. 2. FIG. 2 illustrates a timing diagram depicting various voltages and currents associated with a transition or current delivery between PSUs 110 and BBUs 120, in accordance with embodiments of the present disclosure.

In operation, when alternating current input sources 116 are operating without fault, such as shown in FIG. 2 prior to a time labeled $t_1$, controllers 112 may communicate via the current share bus in order to control the amount of current delivered to the power bus by each PSU 110. Numerous approaches for performing current sharing among PSUs are well known in the art, including without limitation, master-slave current sharing (e.g., in which "slave" PSUs attempt to track current delivered by a "master" PSU having the highest current of the PSUs) and average current sharing (e.g., each PSU attempts to track an average current generated by each PSU). The voltage CS_BUS may operate in a defined range (e.g., zero to eight volts) wherein the voltage CS_BUS is indicative of (e.g., proportional to) a target current to be delivered by a PSU 110. In some embodiments, the minimum value of voltage CS_BUS may correspond to a minimum target current and the maximum value of voltage CS_BUS may correspond to a maximum target current such that a ratio of the voltage CS_BUS to its maximum value is indicative of the portion of a rated power capacity of a PSU 110 which is delivered when outputting the target current. Thus, if voltage CS_BUS has a range of 0 to 8 volts and has a voltage of 6 volts, each PSU 110 may attempt to deliver an amount of power equal to 6/8=75% of its maximum power rating.

At time $t_1$, alternating current input sources 116 may experience a fault, as indicated by the sinusoidal waveform $V_{IN}$ decreasing to a magnitude of zero at time $t_1$. At such time, PSUs 110 may enter a ride-through period $T_{rt}$, as discussed in the background section, and such ride-through period $T_{rt}$ may end at time $t_2$.

At time $t_2$, PSUs 110 may de-assert signals AC_OK, indicating that alternating current input sources 116 have experienced a fault and that the ride-through period $T_{rt}$ has ended. Controllers 122 of BBUs 120 may receive such de-assert signal AC_OK or a derivative thereof, at which point BBUs 120 may turn on and PSUs 110 and BBUs 120 may begin virtual current sharing between the period between time $t_2$ and time $t_3$ (the "transition period") during which current delivery transitions from PSUs 110 to BBUs 120, as described in greater detail below.

During the transition period, the presence of diodes 130 may cause BBUs 120 to act as forced slaves on the current share bus, such that BBUs 120 control their respective currents in accordance with a current share voltage CS_BUS established by PSUs 110. In other words, the presence of diodes 130 prevents any BBU 120 from becoming a "master" during the transition period and forces such BBUs 120 to act of slaves. For each BBU 120, its power capacity may be mapped to the voltage range of the current share bus, such that a ratio of the voltage CS_BUS to its maximum value is indicative of the portion of a rated power capacity of a PSU 110 which is delivered when outputting a target current in accordance with the voltage CS_BUS. In these and other embodiments, a default output voltage of a BBU 120 may be lower than that of a PSU 110. For example, a default output voltage of a BBU 120 may be 12 volts while a default output voltage of a PSU 110 may be 12.2 volts.

In accordance with the virtual current sharing described above, an output voltage $V_{PSU}$ of a PSU 110, an output voltage $V_{BAT}$ of a BBU 120, an output current $i_{BBU}$ of a BBU 120, an output current $i_{PSU}$ of a PSU 110, and the voltage CS_BUS may vary as depicted in FIG. 2. During this period, the current $i_{BBU}$ at time t2 when BBUs 120 are turned on may be at or near zero. During the transition time, BBUs 120 will monitor the current share bus, but diode 130 in each BBU 120 will prevent each BBU 120 from actively driving the current share bus. Accordingly, BBUs 120 act like forced slave units, regardless of whether a master-slave or average method is used for current sharing between PSUs 110.

At time $t_3$, PSU 110 may cease generating output current, at which point BBUs 120 alone provide energy to components of information handling system 102. After such time $t_3$, diodes 130 present in BBUs 120 may ensure master-slave type current sharing after PSUs 110 power down, such that the BBU 120 with the highest current will drive the current share bus through its respective diode 130. In some embodiments, the control loop created by controllers 122 and the current share bus may have a low bandwidth, so as to ensure current stability when PSUs 110 are powered down.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system comprising:
an information handling resource;
a power supply unit for supplying electrical energy to the information handling resource via a power bus; and
a battery back-up unit for supplying electrical energy to the information handling resource via the power bus in response to a power event affecting an ability of the power supply unit to deliver electrical energy to the power bus, the battery back-up unit configured to, in response to the power event and prior to the power supply unit ceasing to deliver electrical energy to the power bus:
monitor a current share bus having a current share signal driven at least in part by the power supply unit, the current share signal indicative of a first current driven by the power supply unit to the power bus;
drive a second current to the power bus in accordance with the current share signal; and
refrain from driving the current share bus.

2. The information handling system of claim 1, wherein the battery back-up unit comprises a diode arranged to prevent the battery back-up unit from driving the current share bus prior to the power supply unit ceasing to deliver electrical energy to the power bus.

3. The information handling system of claim 1, further comprising a second battery back-up unit for supplying electrical energy to the information handling resource via the power bus in response to the power event, the second battery back-up unit configured to in response to the power event and prior to the power supply unit ceasing to deliver electrical energy to the power bus:
    monitor a current share bus having a current share signal driven at least in part by the power supply unit, the current share signal indicative of a first current driven by the power supply unit to the power bus;
    drive a third current to the power bus in accordance with the current share signal; and
    refrain from driving the current share bus.

4. The information handling system of claim 3, wherein in response to the power supply unit ceasing to deliver electrical energy to the power bus:
    one of the battery back-up unit and the second battery back-up unit drives the current share signal to the current share bus; and
    the other of the battery back-up unit and the second battery back-up unit:
        monitors the current share bus having a current share signal driven at least in part by the power supply unit, the current share signal indicative of a first current driven by the power supply unit to the power bus;
        drives a current to the power bus in accordance with the current share signal; and
        refrains from driving the current share bus.

5. The information handling system of claim 4, wherein the one of the battery back-up unit and the second battery back-up unit comprises the one of the battery back-up unit and the second battery back-up unit delivering a larger current to the power bus.

6. The information handling system of claim 1, wherein the power supply unit has a higher default output voltage than the battery back-up unit.

7. A battery back-up unit for supplying electrical energy to an information handling resource via a power bus in response to a power event affecting an ability of a power supply unit to deliver electrical energy to the information handling resource via the power bus, the battery back-up unit configured to, in response to the power event and prior to the power supply unit ceasing to deliver electrical energy to the power bus:
    monitor a current share bus having a current share signal driven at least in part by the power supply unit, the current share signal indicative of a first current driven by the power supply unit to the power bus;
    drive a second current to the power bus in accordance with the current share signal; and
    refrain from driving the current share bus.

8. The battery back-up unit of claim 7, wherein the battery back-up unit comprises a diode arranged to prevent the battery back-up unit from driving the current share bus prior to the power supply unit ceasing to deliver electrical energy to the power bus.

9. The battery back-up unit of claim 7, wherein in response to the power supply unit ceasing to deliver electrical energy to the power bus:
    one of the battery back-up unit and a second battery back-up unit drives the current share signal to the current share bus; and
    the other of the battery back-up unit and the second battery back-up unit:
        monitors the current share bus having a current share signal driven at least in part by the power supply unit, the current share signal indicative of a first current driven by the power supply unit to the power bus;
        drives a current to the power bus in accordance with the current share signal; and
        refrains from driving the current share bus.

10. The battery back-up unit of claim 9, wherein the one of the battery back-up unit and the second battery back-up unit comprises the one of the battery back-up unit and the second battery back-up unit delivering a larger current to the power bus.

11. The battery back-up unit of claim 7, wherein the power supply unit has a higher default output voltage than the battery back-up unit.

12. A method comprising, in a system comprising a battery back-up unit for supplying electrical energy to an information handling resource via a power bus in response to a power event affecting an ability of a power supply unit to deliver electrical energy to the information handling resource via the power bus, in response to the power event and prior to the power supply unit ceasing to deliver electrical energy to the power bus:
    monitoring, by the battery back-up unit, a current share bus having a current share signal driven at least in part by the power supply unit, the current share signal indicative of a first current driven by the power supply unit to the power bus;
    driving, by the battery back-up unit, a second current to the power bus in accordance with the current share signal; and
    refraining, by the battery back-up unit, from driving the current share bus.

13. The method of claim 12, further comprising preventing, by a diode integral to the battery back-up unit, battery back-up unit from driving the current share bus prior to the power supply unit ceasing to deliver electrical energy to the power bus.

14. The method of claim 12, further comprising, in response to the power supply unit ceasing to deliver electrical energy to the power bus, communicating, between the battery back-up unit and a second battery back-up unit via the current share bus, such that:
    one of the battery back-up unit and a second battery back-up unit drives the current share signal to the current share bus; and
    the other of the battery back-up unit and the second battery back-up unit:
        monitors the current share bus having a current share signal driven at least in part by the power supply unit, the current share signal indicative of a first current driven by the power supply unit to the power bus;
        drives a current to the power bus in accordance with the current share signal; and
        refrains from driving the current share bus.

15. The method claim 14, wherein the one of the battery back-up unit and the second battery back-up unit comprises the one of the battery back-up unit and the second battery back-up unit delivering a larger current to the power bus.

16. The method of claim 12, wherein the power supply unit has a higher default output voltage than the battery back-up unit.

* * * * *